United States Patent Office 3,352,812
Patented Nov. 14, 1967

3,352,812
CONCRETE JOINT SEALANT CONTAINING CARBON BLACK, ZINC OXIDE AND POLYSULPHIDE ALDEHYDE COPOLYMER
Thomas M. Parham, Jr., Colonial Heights, Va., assignor to Allied Chemical Corporation, New York, N.Y., a corporation of New York
No Drawing. Filed Aug. 10, 1964, Ser. No. 388,715
11 Claims. (Cl. 260—31.8)

This invention relates to a new sealant and more particularly to a new one-component sealant and to a process for the preparation of the same.

Many commercial concrete joint sealants presently available are composed partially or totally of various polysulfide type polymers and have been heretofore acknowledged to be the best joint sealants for filling expansion joints in concrete slabs, etc., on the market. All such polysulfides containing sealants heretofore provided are so-called two component sealants, i.e., they contain polysulfides and other ingredients as one component and an oxidizer, normally lead peroxide as a second component. They are applied to joints in concrete at ambient temperature and require mixing of the oxidizing agent with a low molecular weight, substantially liquid, mobile polysulfide polymer. The mixture of the polysulfide component with the oxidizing agent or second component must be, when applied to concrete joints, immediately extruded or poured into the joint at ambient temperature. When the material is mixed and immediately applied to a concrete joint, the low molecular weight polysulfide polymer further polymerizes in place to a high molecular weight rubbery sealant. These two component systems have certain disadvantages which may be set forth as follows:

(A) Limited shelf life because of the tendency of the low molecular weight polysulfide polymers to gradually polymerize further, thus increasing molecular weight to a point where polymers are not sufficiently mobile to permit proper use;

(B) Frequent failure of the two component systems to cure properly in place as a result of malfunction of complex equipment required to rapidly blend two components in precisely metered quantities while sealant is being applied to a concrete joint;

(C) Extremely limited working life brought about by rapid curing of the sealant to a relatively immobile mass;

(D) Long periods of time, say 1–10 hours necessitated to achieve a tack-free condition permitting passage of traffic over the concrete joint. These two component systems are liquid and as such necessitate larger containers to contain the first component than if a polysulfide solid concrete sealant could be utilized. Furthermore, since the sealants heretofore provided have been two component systems, there always has been the necessity of providing two containers of ingredients to be shipped to job sites and the like. In addition, two component sealants require complex pumping and metering systems to achieve the proper blends.

It is the object of this invention, therefore, to provide a concrete joint sealant which has only one component, thus obviating the necessity for use of a plurality of containers.

Another object of this invention is to provide a polysulfide one component sealant which has an extended shelf life and does not tend to gradually further polymerize during storing.

It is still another object of this invention to provide a one component polysulfide sealant which can be readily applied to concrete joints, cracks and the like without the necessity for complex equipment.

These and other objects of this invention will become more apparent from the following complete description and appended claims.

In accordance with my invention, I provide a one component polysulfide sealant composition consisting essentially of a normally solid, high molecular weight copolymeric polysulfide having a formula

$$(CH_2S_2)_m\text{---}(CH_2CH_2OCH_2CH_2S_2)_n$$

wherein $m$ and $n$ are integers, 10 to 25% by weight carbon black and 2 to 17% by weight zinc oxide both based on the weight of the polysulfide provided that the combined amounts of carbon black and zinc oxide are sufficient to substantially eliminate plastic flow of the polysulfide at ambient temperatures in the sealant composition but are not so great as to necessitate temperatures which degrade the polysulfide when the sealant composition is heated to its flow point. Commercial two-component polysulfide sealants are viscous liquids until blended and applied. After cure, high molecular weight, essentially non-flowing elastomers result. On the other hand, the polysulfide sealant of the present invention is a solid, elastomeric substance at room temperature with the ability to flow when heated to permit sealant application. Although molecular weight of our sealant has not been determined, it is apparent that the solid polysulfide sealant of the present invention is of much higher molecular weight than the uncured liquid polysulfide sealants of the prior art. The fact that it will soften and flow when heated indicates that it is different in chemical structure from the nonflowing cured sealant heretofore provided. The nature of the difference in chemical structure is unknown.

If the amount of carbon black is less than 10% by weight based on the amount of polysulfide, the sealant will not be sufficiently reinforced by the carbon black as the carbon black is the main ingredient in the sealant composition which resists plastic flow of the polysulfide. On the other hand, if the amount of carbon black is greater than 25% by weight based on the amount of polysulfide, the material will be too tough and rigid to apply to the joint between concrete slabs and the like, since in the general method of application of my sealant the same is heated until it softens and reaches its flow point. Thus, a sealant with excessive amounts of carbon black or zinc oxide will necessitate higher temperatures to reach its flow point which temperatures in certain instances will cause degradation of the polysulfide polymer. With respect to the zinc oxide, if there is less than 2% by weight zinc oxide on this amount of polysulfide, there will be appreciable plastic flow of the polysulfide and the composition will not function satisfactorily as a sealant. On the other hand, if the amount of zinc oxide exceeds 17% by weight based on the amount of polysulfide present, the resultant sealant composition will require temperatures too high to avoid polymer degradation when heated to the flow point. Within the ranges given above with respect to the carbon black and zinc oxide, we prefer about 15 parts by weight carbon black and between 5–10 parts by weight zinc oxide per 100 parts by weight polysulfide. At above 10 parts by weight zinc oxide per 100 parts polysulfide, the composition does not have any more beneficial properties due to greater amounts of zinc oxide and hence there is a slight unnecessary economic loss occasioned thereby. It is to be realized that the broad ranges given above are all considered critical and deviation beyond these ranges produces a useless one component sealant.

Although a sealant can contain amounts of carbon black between 10 and 25% by weight and 2 to 17% by weight zinc oxide, both based on the amount of polysulfide present, the composition will not necessarily be useful as a sealant. The amounts of carbon black and zinc oxide to be present in a composition useful as a sealant are interdependent upon one another. The carbon black is believed to exert twice the reinforcing or plastic flow eliminating effect as determined by penetration and flow tests in the sealant as is provided by the zinc oxide. Yet, it is believed that the zinc oxide also provides a vulcanizing effect or increases the degree of polymerization by reaction with available —SH polymer terminal groups to form disulfide linkages as:

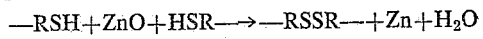

In view of the interdependency of the two ingredients in the sealant, no numerical standard of which I am aware can be set forth as a guide to preparing the one component polysulfide sealant composition of this invention other than the above broad ranges.

The particular type of carbon black employed is not critical but carbon black designated by the rubber trade as grade HAF rubber black is suitable. Technical grade zinc oxide is also suitable.

Preferably in the one component polysulfide sealant of my invention there is contained a small percentage, say of 5 to 10% by weight based on the weight of polysulfide of a plasticizer. This is preferred because plasticization lowers the embrittlement temperature of the sealant. Any commercial plasticizer can be suitably employed such as dimethyl phthalate, dicyclohexyl phthalate, diisooctyl phthalate, di-2-ethylhexyl phthalate and preferably di-n-butyl phthalate. An amount of plasticizer less than 5 parts by weight usually does not provide any practical effect, while amounts in excess of 10% by weight adversely affect the sealant composition.

The polysulfide polymer utilized in my sealant composition is a copolymer polysulfide and can be prepared in accordance with U.S.P. 2,363,616 of Nov. 28, 1944, to Patrick for "Aldehyde Copolymer." U.S.P. 2,363,616 defines the copolymers of the invention as $$(CH_2S_{2\ to\ 6})_m—(C\ .\ .\ .\ CS_{2\ to\ 6})_n$$

where C is a single carbon atom, C . . . C are carbon atoms separated by an intervening structure, S is a sulfur atom and $m$ and $n$ are integers, the ratio of which signifies the molecular ratios of the radicals $(CH_2S_{2\ to\ 6})$ and $(C\ .\ .\ .\ CS_{2\ to\ 6})$. In our invention the copolymer used is 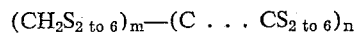. Any of the routes to this copolymer described in U.S.P. 2,363,616 would be suitable but the preferred method is the one described hereinafter. As far as I have determined the copolymer utilized in this invention must be —S$_2$— as compositions from —S$_3$ to S$_6$— as described in U.S.P. 2,363,616 would be unsuitable as these co-polymers tend to become too brittle when utilized in a sealant composition. The polymer I use is an elastomeric copolymeric polysulfide of high molecular weight solid at room temperature and preferably contains ½ to 1.5% by weight based on the total weight of cross linked polysulfide polymer as determined by weight of reactants used. It is preferably cross-linked using 1,2,3 trichloropropane as the cross-linking agent. An amount of cross-linking less than ½% by weight polysulfide polymer provides no benefit in the overall sealant composition, while an amount of cross-linking substantially more than 1.5% by weight of the polysulfide polymer causes the resultant sealant composition to be too intractible when heated to permit application to joints when used as a one component sealant composition.

The one component sealant composition of my invention is prepared by heating a normally solid, high molecular weight copolymeric polysulfide polymer of U.S.P. 2,363,616 above cited having sulfide units of —S$_2$— as above described on a roll mill at a temperature at which it softens and sticks to the rolls. Carbon black and zinc oxide in proportions stated above, the carbon black and zinc oxide, preferably being previously blended into a homogeneous mixture, are then added to the roll mill as fast as it will be absorbed by the polysulfide polymer. Absorption is determined or observed by noticing the tendency of the carbon black and zinc oxide to readily blend with the polysulfide polymer. This blending can be accompanied by slow addition of carbon black and zinc oxide. However, slow addition of these components is unnecessary and merely time wasting. On the other hand, too rapid addition causes some of the additives to fall from the rolls, resulting in waste or need for recovering the additives. While it is preferred that the carbon black and zinc oxide are previously blended into a homogeneous mixture prior to addition into the rolls containing the polysulfide polymer, it is not necessary. However, if a homogeneous mixture is not used longer blending time on the rolls will be necessary to achieve homogeneity of the sealant composition. After addition is complete and the polymer composition is at its softening point, usually 110°–170° C., the composition is further compounded on the roll to achieve homogeneity, usually 15 to 20 minutes. The homogeneous composition is subsequently scraped from the mill and permitted to cool. The resultant composition is a tough, rubbery product which is the finished sealant.

My sealant is applied to a concrete joint by heating the same to its flow point and injecting the same under pressure while at its flow point into the concrete joint. My sealant composition can be applied to a concrete joint using a caulking gun or similar device provided with gaskets and seals of heat resistant material, e.g. polytetrafluoroethylene, and with a nozzle of size permitting it to be placed into the concrete joint, crack or the like to the bottom thereof. The procedure is as follows:

(A) Load the gun with my sealant composition and heat the gun until the sealant composition reaches its flow point, usually 170 to 190° C., at which time the sealant is a tacky plastic material capable of being extruded under pressure.

(B) When heated to the flow point of the sealant composition, the tip of the gun nozzle is inserted into the concrete joint and the solution is extruded into the joint by application of pressure of the plunger of the gun;

(C) The joint is filled in slight excess and is smoothed over immediately after application and before the applied sealant is appreciably cooled. The smoothing operation is to depress excess sealant into the joint and to scrape off any sealant remaining above the joint after complete filling.

In order to illustrate the nature of my invention and the manner of practicing the same, the following example is presented:

*Example 1*

A polysulfide polymer was prepared as follows: MgCl$_2$·6H$_2$O (405 grams) and 160 grams NaOH were placed in a pressure vessel fitted with a lid. 30 mols (15 liters) Na$_2$S$_2$ solution (about 2 M) were pumped into the vessel after the lid was closed. The Na$_2$S$_2$ solution was prepared by adding 32 liters H$_2$O to a vessel and introducing therein 7640 g. NaOH. When the NaOH dissolved in solution, 6144 g. elemental sulfur was added together with 25 g. sodium alkyl naphthalene sulfonate as a surfactant to promote wetting of the sulfur and to prevent coagulation of the dispersed polymer prepared in the reaction. The reactor was brought to about 100° C. by applying low pressure steam to a steam coil. The vessel was fitted with a loose fitting lid and the contents were stirred at 100° C. for at least 6 hours. After 6 hours reaction, the vessel contents were cooled to room temperature and water added to bring the volume up to 32 liters.

The solution of MgCl$_2$·6H$_2$O, NaOH and Na$_2$S$_2$ was stirred gently. 12.5 mols formaldehyde (37% aqueous solution) was then admitted into the vessel and the contents were allowed to react gently for 2 hours at room temperature. At the end of the 2-hour period, the stirring speed was substantially increased and $CO_2$ was admitted into the vessel at a pressure of 25 p.s.i.g. After 30 minutes the carbon dioxide addition was stopped, the pressure was relieved and the temperature of the reaction mixture was increased to 80° C. and maintained at that temperature. 12.25 mols bis(2-chloroethyl) ether were then admitted to the reaction vessel at an even rate over a 90-minute period together with a 0.25 mol 1,2,3-trichloropropane. When the ether addition was complete stirring and heating were continued for one hour. At the end of one hour stirring and heating were stopped, allowing the reaction mixture to settle undisturbed for 20 minutes.

The liquid in the reaction vessel was decanted and the residual solid was washed several times with 16 liters of water, each time with vigorous stirring for 3 minutes, followed by 20 minutes settling and decantation of supernatant liquid between washes. After the initial washing procedure was performed the polysulfide polymer so obtained was taken out of the vessel and placed in the sigma-arm mixer and washed for one hour in a stream of running water at ambient temperature with the mixer operating. The mixer was then stopped and the water drained off.

2 liters of 5% acetic acid were added to the polymer in the sigma-arm mixer and the mixer was started to give the polymer an acid wash to remove the last traces of $Mg(OH)_2$, and $Na_2S_2$ and sodium carbonate formed in the reaction. After the polymer was acid washed, it was again washed for 1 hour in a stream of running water as set forth above. At the end thereof, the polymer was removed from the mixer and dried in a vacuum oven at about 70° C. for 4 hours.

The product so obtained was a cross-linked copolymeric polysulfide, the 1,2,3 trichloropropane being the cross-linking agent. It was a solid, very resilient, olive-green material, which was homogeneous throughout and was translucent in thin films. It had a faint sulfurlike odor and had a slight tendency to undergo plastic flow at room temperature.

100 parts by weight of the above solid high molecular weight copolymeric polysulfide polymer is rolled milled to about 120° C. until the polymer is thoroughly soft and sticks to the rolls. 25 parts by weight carbon black and 10 parts by weight zinc oxide previously blended into a homogeneous mixture is then added as fast as it will be absorbed by the polymer. After this addition is completed and while still at 120° C. the mixture is further compounded on the mill for 15 to 20 minutes whereupon composition is homogeneous.

The material is scraped from the mill and permitted to cool forming a tough, rubbery product which is the finished sealant. The sealant composition is utilized as a concrete joint sealant in accordance with the above procedure.

In order to illustrate the best mode of practicing my invention, the following example is set forth.

*Example 2*

$MgCl_2 \cdot 6H_2O$ (405 grams) and 160 grams NaOH were placed in a pressure vessel fitted with a lid and means for stirring. Eleven mols (5.5 liters) $Na_2S_2$ solution (ca. 2 M) were pumped into the vessel after the lid was closed. The $Na_2S_2$ solution was prepared by adding 32 liters $H_2O$ to a vessel and introducing therein 7640 grams NaOH. When the NaOH dissolved in solution, 6144 grams elemental sulfur was added together with 25 grams sodium alkyl naphthalene sulfonate as a surfactant to promote wetting of the sulfur and to prevent coagulation of the dispersed polymer prepared in the reaction. The reactor was brought to about 100° C. by applying low pressure steam to a steam coil. The vessel was fitted with a loose fitting lid and the contents were stirred at 100° C. for at least 6 hours. After 6 hours reaction, the vessel contents were cooled to room temperature and water added to bring the volume up to 32 liters. The solution of $MgCl_2 \cdot 6H_2O$, NaOH and $Na_2S_2$ aqueous solution) was then admitted into the vessel and was stirred gently. Eight mols formaldehyde (37%) the contents were allowed to react with gentle stirring for two hours at room temperature. At the end of the 2-hour period, the stirring speed was substantially increased and $CO_2$ was admitted into the vessel at a pressure of 25 p.s.i.g. After 30 minutes the $CO_2$ addition was stopped and the pressure relieved. An additional 17 moles (8.5 liters) $Na_2S_2$ solution was admitted to the vessel. The temperature of the reaction mixture was increased to 80° C. and maintained at that temperature. A mixture of 11.9 mols bis(2-chloroethyl) ether and 0.1 mol 1,2,3-trichloropropane were admitted to the reaction vessel over a one hour period. Upon completion of the addition of the preceding mixture, heating and stirring were continued for one hour. At the end of one hour, stirring and heating were stopped, allowing the reaction mixture to settle for twenty minutes.

The liquid in the reaction vessel was decanted and the residual solid was washed several times with 16 liters of water, each time with vigorous storring for 3 minutes, followed by 20 minutes settling and decantation of supernatant liquid between washes. After the initial washing procedure was performed the polysulfide polymer so obtained was taken out of the vessel and placed in a sigma-arm mixer and washed for one hour in a stream of running water at ambient temperature with the mixer operating. The mixer was then stopped and the water drained off.

The polymer was then thoroughly mixed in a sigma-arm mixer for 30 minutes with a solution of 2071 grams sodium sulfite in 10.5 liters of water. The temperature of the mixture was kept at ca. 100° C. during the treatment. After such treatment, the $Na_2SO_3$ solution was drained off and the polymer again washed for one hour in a stream of running water at ambient temperature with the mixer operating. The water was drained off.

Two liters of 10% sulfuric acid were added to the polymer in the sigma-arm mixer and the mixer was started to give the polymer an acid wash to insure removal of any residual basic materials. After the polymer was acid washed, it was washed a third time for one hour in a stream of running water as set forth above. At the end thereof, the polymer was removed from the mixer and dried in a vacuum oven at about 70° C. for four hours.

The product so obtained was a cross-linked copolymeric polysulfide, cross-linking having been obtained by the reaction with 1,2,3-trichloropropane, with excess sulfur above rank-2 having been removed (rank being defined as the average number of sulfur atoms contained in each sulfur linkage of the polymer). It was a solid, very resilient, olive-green material which was homogeneous throughout and was translucent in this films. It posssessed a faint sulfur-like odor and had a slight tendency to undergo plastic flow at room temperature. The product became brittle at $-33$ to $-37°$ C. and elemental analyses of various batches showed it to contain ca. 25–28% carbon and 56–59% sulfur.

One hundred parts by weight of the above solid high molecular weight copolymeric polysulfide polymer is added to a roll mill, the rolls of which are heated to about 150° C. and milled until the polymer is thoroughly soft and sticks to the rolls. Twenty-five parts by weight carbon black and ten parts by weight zinc oxide previously blended into a homogeneous mixture is then added as fast as it will be absorbed by the polymer. After this addition is completed, three parts by weight maleic acid is added followed by ten parts by weight di-n-butyl phthalate. While still at 150° C. the mixture is further compounded on the mill for 10–15 minutes whereupon composition is homogeneous.

The material is scraped from the mill and permitted to cool forming a tough, rubbery product which is the finished sealant. The sealant is utilized as a concrete joint sealant in accordance with the above procedure.

Federal Specification SS–S–00200b (Army CE) is the most rigorous specification covering concrete joint sealants but is written specifically for two-component, cold applied sealants. It, therefore, contains many requirements applicable to two-component sealants only. No one-component, hot-applied, polysulfide-type concrete joint sealant of which I am aware has heretofore been provided. Consequently, federal, state or other specifications do not exist to cover them. However, minimum specifications for a suitable joint sealant of any type can be inferred from SS–S–00200b, and my one-component, hot-applied sealant met or exceeded the following requirements of SS–S–00200b insofar as the tests could be modified to permit testing of one-component, hot-applied sealants.

| Test | Applicable Section of SS-S-00200b | Result |
|---|---|---|
| Penetration (nonimmersed) | 4.4.3.1 | Passed Test. |
| Penetration (fuel immersed) | 4.4.3.2 | Do. |
| Change in Weight | 4.4.4 | Exceeds Requirements. |
| Resilience | 4.4.5 | Passed Test. |
| Bond Test (nonimmersed) | 4.4.6.3 | Do. |
| Bond Test (fuel immersed) | 4.4.6.4 | Do. |
| Flame Resistance | 4.4.7 | Exceeds Requirements. |
| Flow Test | 4.4.8 | Do. |

Many samples have been prepared containing more than 25 parts carbon black and/or 10 parts zinc oxide per 100 parts polysulfide polymer. It has been observed that use of substantially more than these critical amounts of carbon black and zinc oxide results in products which (1) will not soften sufficiently to flow as a sealant below decomposition temperatures, (2) will not become tacky enough below decomposition temperatures to form a bond with joint surfaces, (3) possess higher embrittlement temperatures than desirable, (4) have tensile strength so great that bond fails when joint expands and (5) often tend to crack and crumble under strain of repeated flexing.

From the foregoing it is readily apparent that I have provided a significant contribution to the art of sealants. I have provided a one-component sealant which is characterized by a long shelf life, does not necessitate complicated equipment for application to concrete joints, nor requires extensive packaging or on-site mixing. The achievement of a stable degree of polymerization during compounding of my material permits indefinite storage and working life. Additionally, my sealant is more resistant to the effects of ultra violet radiation than any commercial sealants tested thus far as determined by comparing samples of two-component sealants with my new sealant in an Atlas twin-arc Weatherometer used for providing accelerated environmental tests. The ultra violet radiation in the weatherometer was produced by electric arcs between two sets of carbon electrodes. The specimens were subjected to 160 hours radiation at 140° F. using an intermittent water spray for nine minutes during each hour of the test. The tests showed no change in the condition of the one-component sealant of my invention, while the commercial sealants formed blisters, turned dull on the surface and hardened.

Since certain modifications and departures from the above teachings will become apparent to one skilled in the art, my invention should not be construed only in the light of the above as the above has been set forth merely to illustrate my invention and is not to be interpreted as limiting the same.

I claim:

1. A one-component polysulfide sealant consisting essentially of a normally solid elastometric high molecular weight copolymeric polysulfide having the formula $$(CH_2S_2)_m\text{—}(CH_2CH_2OCH_2CH_2S_2)_n$$

wherein $n$ and $m$ are integers, and 10% to 25% by weight carbon black, with 2% to 17% by weight zinc oxide, both based on the weight of polysulfide, provided that the combined amounts of carbon black and zinc oxide are sufficient to substantially eliminate plastic flow of the polysulfide at ambient temperatures in the sealant composition, but are not so great as to necessitate temperatures that degrade the polysulfide when the sealant composition is heated to its flow point.

2. A one-component polysulfide sealant composition according to claim 1 wherein there is 15 parts by weight carbon black and 5 to 10 parts by weight zinc oxide per 100 parts by weight polysulfide.

3. A one-component polysulfide sealant composition according to claim 1 containing 5 to 10% by weight plasticizer based on the weight of polysulfide.

4. A one-component polysulfide sealant composition according to claim 1 wherein the polysulfide polymer contains ½% to 1.5% by weight cross-linked polysulfide polymer based on the total weight of the reactants used.

5. A one-component polysulfide sealant consisting essentially of a normally solid elastomeric high molecular weight copolymeric polysulfide having the formula $$(CH_2S_2)_m\text{—}(CH_2CH_2OCH_2CH_2S_2)_n$$

wherein $n$ and $m$ are integers, and 10% to 25% by weight carbon black with 2% to 17% by weight zinc oxide, both based on the weight of polysulfide, between 5 and 10% by weight plasticizer based on the weight of polysulfide, between ½% to 1.5% by weight cross-linked polysulfide polymer based on the total weight of the reactants used, provided that the combined amounts of carbon black and zinc oxide are sufficient to substantially eliminate plastic flow of the polysulfide at ambient temperatures in the sealant composition, but are not so great as to necessitate temperatures that degrade the polysulfide when the sealant composition is heated to its flow point.

6. A one-component polysulfide sealant according to claim 5 containing 15 parts by weight carbon black, 5 to 10 parts by weight plasticizer and 5 to 10 parts by weight zinc oxide per 100 parts by weight polysulfide.

7. A process for sealing the joints or cracks in concrete which comprises:

(A) heating a one-component polysulfide sealant composition to its flow point said sealant composition consisting essentially of a normally solid elastomeric high molecular weight copolymeric polysulfide having the formula $(CH_2S_2)_m\text{—}(CH_2CH_2OCH_2CH_2S_2)_n$ wherein $n$ and $m$ are integers, and 10 to 25% by weight carbon black with 2% to 17% by weight zinc oxide, both based on the weight of polysulfide, provided that the combined amounts of carbon black and zinc oxide are sufficient to substantially eliminate plastic flow of the polysulfide at ambient temperatures in the sealant composition, but are not so great as to necessitate temperatures that degrade the polysulfide when the sealant composition is heated to its flow point; and (B) injecting the sealant composition under pressure while at its flow point into the concrete joint.

8. A process for sealing joints or cracks in concrete according to claim 7 wherein there is about 5 to 10 parts by weight of zinc oxide per 100 parts by weight of polysulfide in said sealant composition.

9. A process for sealing the joints or cracks in concrete according to claim 7 wherein said sealant composition contains 5 to 10% by weight of plasticizer based on the weight of polysulfide.

10. A process for sealing the joints or cracks in concrete according to claim 7 wherein said copolymeric polysulfide contains about 0.5% to 1.5% by weight of cross-linked polysulfide polymer based on the total weight of the reactants used to prepare said copolymeric polysulfide.

11. A process for sealing the joints or cracks in concrete which comprises:

(A) heating a one-component polysulfide sealant composition to its flow point, said sealant composition consisting essentially of a normally solid elastomeric high molecular weight copolymeric polysulfide having the formula $$(CH_2S_2)_m\text{—}(CH_2CH_2OCH_2CH_2S_2)_n$$

wherein $n$ and $m$ are integers and 10 to 25% by weight of carbon black with 5 to 10% by weight of zinc oxide, both based on the weight of polysulfide, about 5 to 10% by weight of plasticizer based on the weight of polysulfide, and about 0.5 to 1.5% by weight of cross-linked polysulfide polymer based on the weight of reactants used to prepare said copolymeric polysulfide.

References Cited

UNITED STATES PATENTS

| | | | |
|---|---|---|---|
| 2,363,616 | 12/1944 | Patrick | 260—79.1 |
| 2,718,691 | 9/1955 | Sussenback | 260—37 |

OTHER REFERENCES

M. Morton: "Introduction to Rubber Technology," Reinhold Publishing Co., N.Y., TS 1890 M66 C. 5 pp. 363, 365, 366, 367, 372, 373, 376, 380.

MORRIS LIEBMAN, *Primary Examiner.*

J. E. CALLAGHAN, *Assistant Examiner.*